United States Patent
Hotti et al.

[11] Patent Number: 6,144,941
[45] Date of Patent: Nov. 7, 2000

[54] INTELLIGENT TRANSACTION

[75] Inventors: Timo Hotti; Jarmo Parkkinen, both of Helsinki, Finland

[73] Assignee: Solid Information Technology Oy, Helsinki, Finland

[21] Appl. No.: 09/028,940

[22] Filed: Feb. 24, 1998

[30] Foreign Application Priority Data

Feb. 24, 1997 [FI] Finland ................................ 970777

[51] Int. Cl.⁷ ............................................... G06F 17/60
[52] U.S. Cl. ............................... 705/4; 705/26; 705/30; 707/10
[58] Field of Search ................... 707/1–10, 100–104, 707/200–206; 705/2, 4, 26, 27, 30, 40, 42; 709/203, 216, 250; 713/200, 201

[56] References Cited

U.S. PATENT DOCUMENTS

| | | | |
|---|---|---|---|
| 5,222,018 | 6/1993 | Sharpe et al. | 705/30 |
| 5,550,734 | 8/1996 | Tarter et al. | 705/4 |
| 5,579,482 | 11/1996 | Einkauf et al. | 709/220 |
| 5,897,622 | 4/1999 | Blinn et al. | 705/26 |
| 5,931,917 | 8/1999 | Nguyen et al. | 709/250 |

FOREIGN PATENT DOCUMENTS

| | | | |
|---|---|---|---|
| 0 394 019 A2 | 10/1990 | European Pat. Off. | G06F 15/40 |
| 0 724 223 A1 | 7/1996 | European Pat. Off. | G06F 17/30 |

*Primary Examiner*—Ruay Lian Ho
*Attorney, Agent, or Firm*—Locke Liddell & Sapp LLP

[57] ABSTRACT

A plurality of steps, which are intended to modify the data in a transaction, form a transaction (40) comprising statements (41, 42, 43). In the method according to the invention there is formed a data exchange space (47) common to the transaction in order to make the parameters available to the statements belonging to the transaction and in order to transmit data between the statements belonging to the transaction. The system (30) maintaining the first version of the database is arranged to store the modifications to be made in the database as transactions, which comprise statements as well as parameters, both regarding the statements and regarding the transaction. The system (31) maintaining the second database version is arranged to form a transaction on the basis of the message it receives, whereby the transaction comprises statements, and to reserve an information exchange space (47) in the system memory in order to make the parameters available to the statements belonging to the transaction and in order to transmit data between the statements belonging to the transaction.

8 Claims, 3 Drawing Sheets

INTELLIGENT TRANSACTION

The invention relates generally to transactions used to modify the information contents of databases. Particularly the invention relates to a method and a system associated with these transactions which enable a flexible definition of long transactions and make it possible to keep the database in a valid state when these transactions are used.

The following notions are used in this application:

Data management system=an entity, which comprises one or more databases and/or data management systems, whereby the system is responsible for reading the data structures contained in the databases and/or data management systems and for changing these data structures.

Database=an information structure, which comprises one or more data elements, and the use of which is controlled by the data management system. The invention is applicable both in relational databases and in databases of other forms, such as in object oriented databases.

Data element=an information structure, which can comprise other data elements or such data elements, which can be construed as atomary data elements. For instance, in a relational database data elements are represented by tables comprising rows. The rows comprise fields, which are typically atomary data elements.

Valid state of the data management system=a state in which the information contents of the data management system does not violate the validity conditions currently in force for the data management system. The conditions can be both such conditions, which are independent of the applications utilising the database, such as reference integrity rules of a relational database, and conditions for each application, such as business rules of the application.

Database operation=an event, during which data elements are read from the database, during which data elements of the database are modified, during which data elements are removed from the database, and/or during which data elements are added to the database.

Transaction=a plurality of database operations acting on the data elements. A transaction can also comprise transactions.

Valid transaction=a transaction, which moves the data management system from one valid state into another valid state.

Long transaction=a transaction, whose contents can be built in one or more batches, in one or more data management systems, and which between the batches can be permanently stored in order to be supplemented or performed later. A transaction with a final structure can be later transferred to one or more data management systems in order to be performed.

FIG. 1 shows an example of a known database 10, which contains three tables 11, 12 and 13. Let's assume that the concerned database is a customer and accounts database of a bank, whereby the table 11 can be the customer table, the table 12 can be the accounts table, and the table 13 can be a table of the account entries, or the movements on the account. Each table is further divided into rows, which again comprise fields. In practice the tables only exist in a digital form in a computer memory, so that the geometrical organisation of FIG. 1 should be understood only as a graphical presentation illustrating the notions.

Each row in the customer table 11 represents one customer. The fields of a row are for instance the customer's name, address and customer number. In the accounts table 12 each row represents one account, and its fields are for instance the account number, the account owner's customer number, and the balance of the account. In the account entries table 13 each row corresponds to one entry, and its fields are for instance the account number concerning that entry, the date and time of the entry, and the amount of money transferred in that entry. In FIG. 1 the database rows contain interdependencies, or relations, between the different tables. For instance on the customer row of a certain customer in table 11 there is a relation to all those rows of the accounts table 12 having a number indicating said customer in the customer's number field. Correspondingly, each row in the account entries table 13 has a relation to that row in the accounts table 12, which represents the account of said account event.

Let's now assume a situation when a customer withdraws money from his account. The withdrawal is a new account event, so it creates a new row in the account entries table 13. This action concerns only one table in the database, and it can be generally called a database operation. The database operations as such can concern one or more rows, in one or more tables of the database. Because a withdrawal reduces the balance of the concerned account, a database operation representing the creation of a new account entry row is related to a second database operation concerning the accounts table 12, whereby this second operation reduces the value of the balance field in a record already present in table 12. If, for any reason, only one of these database operations succeeds, then the database would not be in a valid state, because there would be a difference between the balance read from the accounts table 12 and the balance obtained from the account entries table 13, which can be obtained by adding the account entries concerning said account. According to the practice in the industry this conflict is called a transaction consistency violation.

Regarding the processing of databases there is also known another type of violation, called a business rule violation. It refers to a situation, in which a specific database operation or a plurality of database operations violate the so called business rules. As an example of a business rule violation could be a case in which a certain bookkeeping event is entered into such a part of the database where the entry of new events should already have been completed in order to generate summary data and reports.

In order to prevent both transaction consistency violations and business rule violations the interlinked database operations form a so called transaction. If a transaction does not move the data management system from one valid state into another valid state, or if a part of the transaction can not be performed, then all database operations of the transaction concerning the data management system must be cancelled. The transactions can be very complicated, and they can comprise a multitude of database operations. However, the database operations are both physically and logically independent, so in other words they can not directly depend on each other's functions, and there can be no information exchange between them. Database operations belonging to a certain transaction are interlinked only in that sense that they belong to the same transaction.

The data elements in a database can be copied. Copied data elements can be arranged so that one of them is a so called valid version and the others are copies of it. A valid version is a data element which represents a confirmed data element state. The copies will not always represent the same state as the valid version. In this application a master database refers to the plurality of valid data elements in the data management system. In this application a localised database represents the plurality of data elements of the data management system, whereby the data elements are copies of the data elements in the master database. Transactions can operate on a localised database. These transactions can be stored in a localised database and later they can be propagated to the master database. FIG. 2 illustrates a database where the version 20 is the master database comprising the tables 21, 22, 23 and 24. The version 25 is a perfect copy comprising the tables 21', 22', 23' and 24'. The version 26 is partial copy, which comprises a table 22" with all data from the original table 22, and a table 24" with a part of the data from the table 24. The master database can for instance be located in a company's main computer 27, and the copies, or the localised databases, can be located in the branch office computers 28 or in the portable computers 29 of sales representatives. A version hierarchy could also have more than two levels, so that for instance the branch office version 25 is a localised database regarding the master database in the main office, but a master database regarding localised databases (not shown in the figure) used by the branch office's moving personnel. However, each data element has only one valid version which is on the highest level of the hierarchy.

It is not necessary to define a specific database version on the database level as a master database and the other versions as localised databases, but this relation could be an information on the data element level. Thus the same database version can function as a master database or as a localised database, depending on which data elements are studied.

When using a localised database each user modifies only that version which he has access to. In FIG. 2 a sales representative 29 as the result of a customer negotiation makes certain modifications in the localised database available to him. These modifications occur as transactions, whereby the localised database and the application program processing the transactions control that the state of the localised database 26 is valid after each transaction process. Because the concerned database is a localised one the system knows that the same data modifications have to be made in the master database at some time, so it saves the transactions used to process the data elements together with the modified data elements.

The next time when the sales representative is able to communicate data between his portable computer and the main computer 27 of the company he transmits the transactions stored by the system to the main computer, which must make the corresponding modifications in the master database. This operating step is described as propagating transactions from one database version to another, and according to prior art it is made as propagation on the so called database operation level. However, it is possible that in the meantime somebody else has modified the same data elements of the master database, or that the transaction validity criteria have otherwise changed, for instance because the date has changed. Further, usually no application program is available to control the transaction validity in the transaction propagation stage. The transaction may have been valid when the localised database has been processed in the manner dictated by the transaction, but for some of the above mentioned reasons it is not anymore valid in the transaction propagation stage.

During the life of a long transaction there can also occur situations in other connections in which the transaction must be propagated from one version of the database to another, or in which the transaction must be processed later than at the time when it is generated. Propagation on the database operation level, where the database operations are physically and logically independent, does not provide any possibility to adapt transactions depending on the database which they act on. Thus a transaction according to prior art will always generate the same result, which can cause errors in connection with transaction propagation. Due to the inherent problems in prior art it is common to avoid the use of localised databases, whereby in practice all users trying to modify the data must establish a real time communication link to the central database and perform the desired transactions directly in the centrally controlled version of the database.

BRIEF DESCRIPTION OF THE INVENTION

This invention is a method for modifying data in a computer database. During this method, multiple steps form a transaction that comprises statements. At least one of these statements is arranged to transmit information between that statement and another statement.

The object of this invention is to present a method and a system which can prevent transaction consistency violations and business rule violations when long transactions are used. An object of the invention is also to present a method an a system with which it is simple to generate and edit long transactions.

The objects of the invention are attained by forming a transaction comprising statements and parameters relating to each statement and each transaction. When the transaction is later performed there is formed a common data exchange space for the transaction, through which space the statements can exchange data.

The method according to the invention is characterised in that a transaction intended for modifying data in the database comprises statements, of which at least one statement is arranged to transmit data between that statement and another statement, and parameters both regarding the statements and regarding the transaction.

The invention relates also to a system for realising the method according to the invention. The system according to the invention for maintaining a localised database is characterised in that it is arranged to store as transactions the modifications to be made in the database, whereby the transactions comprise statements of which te least one statement is arranged to transmit data between that statement and another statement, and parameters both regarding the statements and regarding the transaction. The system according to the invention for maintaining a master database is characterised in that it is arranged to generate a transaction from the message it receives, whereby the transaction comprises statements, and to reserve a data exchange space in the system memory in order to make the transaction parameters available to the statements belonging to that transaction, and to transmit data between the statements belonging to the transaction.

The structure of a transaction according to the invention is such that it will adapt so that it operates in different ways, depending on the state of the data management system towards which the transaction is directed. Due to the adaptive feature the transaction according to the invention could be called an intelligent transaction. It comprises statements, which can be statements of a particular database language (for instance the SQL language), including procedure calls of the database language, or remote procedure calls to be routed to the application software section. Each statement causes the processing of one or more database operations, which can differ depending on the situation and the environment. Each statement can be given an arbitrary number of parameters. The logic features of a transaction according to the invention require data communication between the statements belonging to the transaction, when the transaction is propagated from one version of the database to another version, or when a stored long transaction is processed later. For this purpose a common data exchange space for the transaction is created, whereby this space is called a bulletin board in this application. Statements, which require data communication within the transaction, can read the data on the bulletin board and write data on the board, but they do not have to know the number, form or function of other statements in the same transaction. A transaction can comprise modular parts, which contain one or more statements. Due to this feature the intelligent transaction according to the invention provides very versatile operating possibilities particularly to a programmer designing the maintenance and updating of a localised database.

In addition to the modified data also those statements functioning as sources of the modification are saved, when the first version of a localised database is edited. The parameters required by the statements are also saved together with the statements, so that they can function in a specific manner. The statements form transactions, and together with each transaction a plurality of parameters describing the transaction properties can be saved. If the transactions have to be propagated to another database version, then the transactions are further formed into messages, which are saved in the message storage in connection with the first version of the database, or which are transmitted to a computer maintaining a second version of the database, whereby this computer saves the messages in its own storage for received messages. The actual transaction propagation is controlled by a synchronisation program run by the computer maintaining the second version of the database. The synchronisation program is a well known concept per se in prior art synchronisation of databases. At the beginning of each transaction the synchronisation program creates a bulletin board in the data management system, or available to it, whereby the bulletin board initially comprises at least information about which database version is the object of the transaction. When a transaction's statement are run they can read parameters in the bulletin board and write their own parameters there. Statements in the database language are directly run by the process control section, but it will route remote procedure calls via the appropriate application program section.

The transaction according to the invention is a long transaction, which comprises statements and parameters for each statement and transaction, and whose statements can communicate with each other using the data exchange space or the bulletin board. The bulletin board is not a part of the transaction itself, but a part of the mechanism for performing the transaction. The statements contained in the transaction can "know" that the processing of a completed transaction utilises a data exchange space, so their own logic can be structured so that it utilises the data exchange with other statements or utilises transaction parameter reading from the bulletin board.

Below the invention is described in more detail with reference to preferred embodiments shown as examples and to the enclosed figures, in which.

Figure 1:
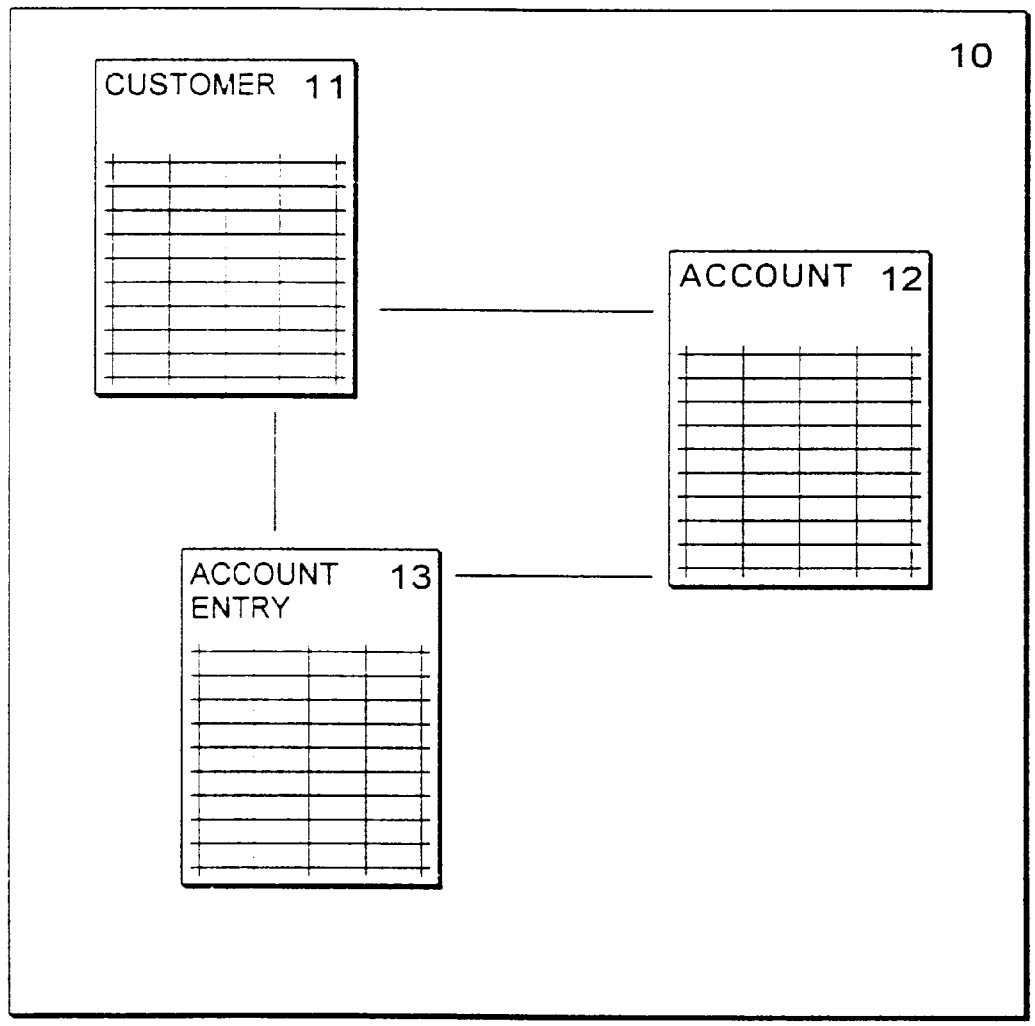
FIG. 1 shows a known database.
Figure 2:
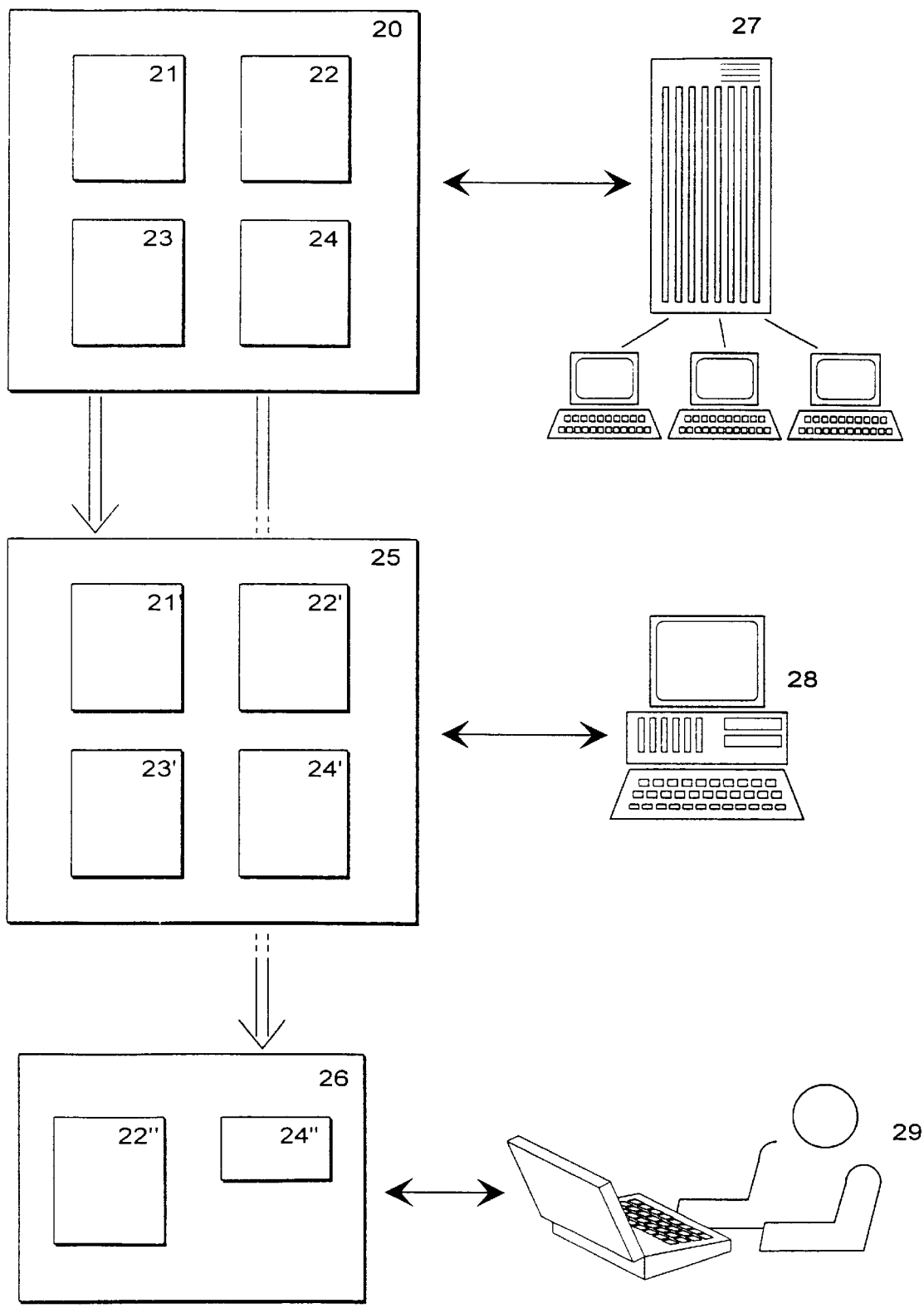
FIG. 2 shows known localised databases and their master database.

In connection with the description of prior art above reference was made to the FIGS. 1 and 2, so in the following description of the invention and its preferred embodiments reference is made primarily to the FIGS. 3 and 4.

Figure 3:
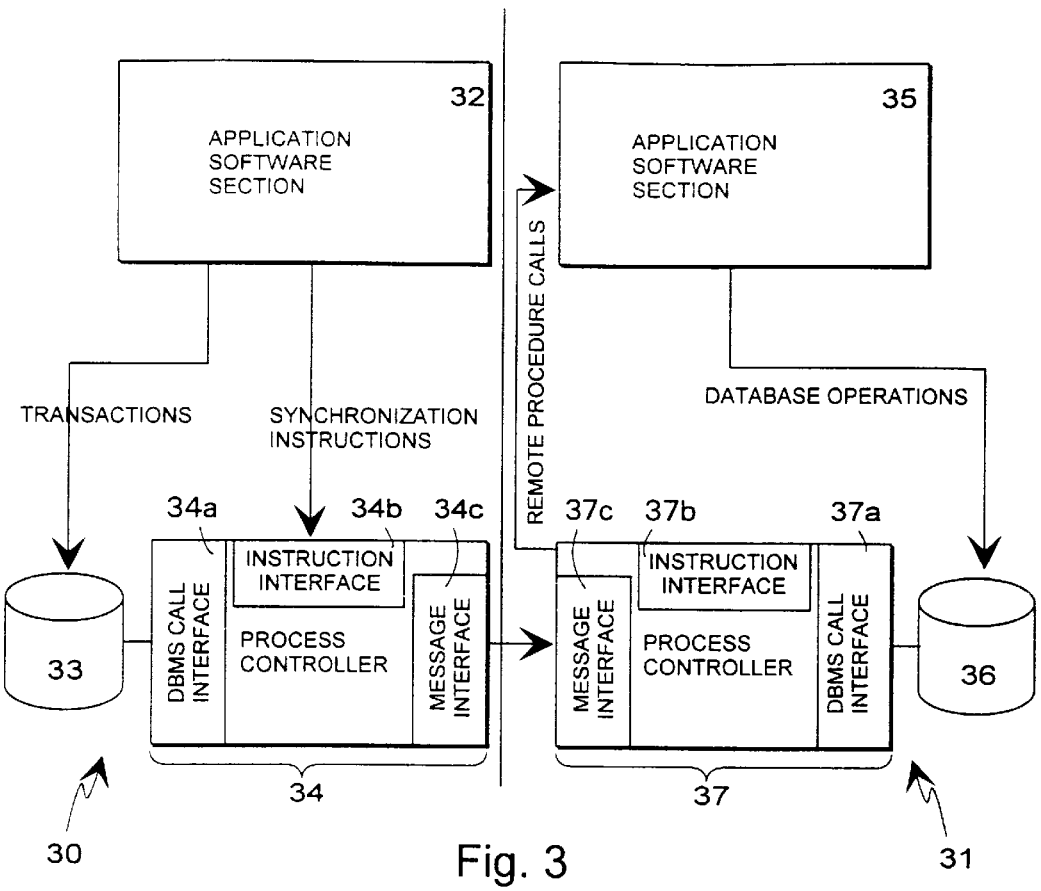
FIG. 3 shows actions according to the invention in order to maintain a localised database and the master database.
Figure 4:
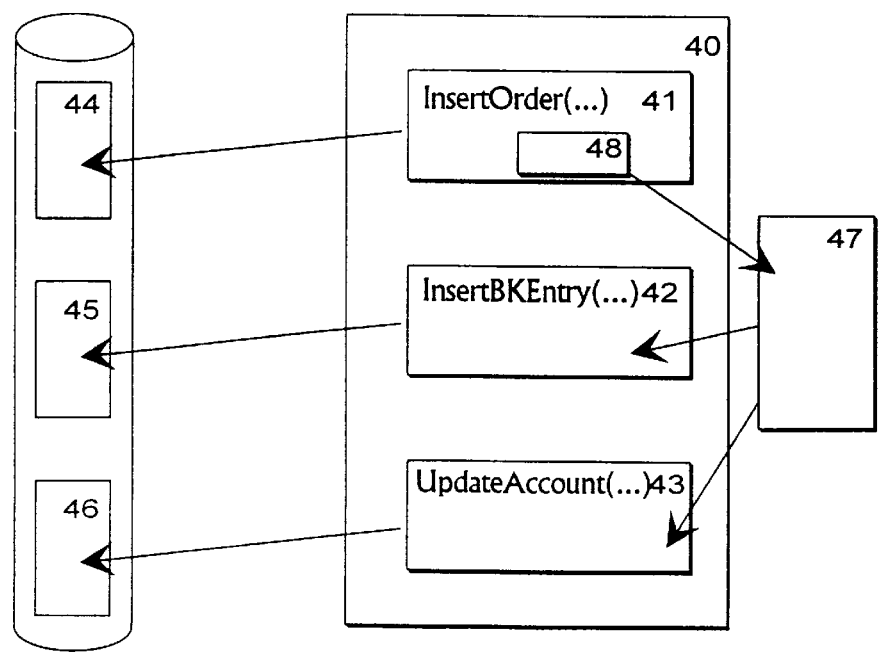
FIG. 4 shows a transaction according to the invention during its processing.

In FIG. 3 the left hand side of the vertical dotted line shows schematically a computer 30 with a localised database, or the first version of a particular database, for short called the copy version, and the right hand side shows schematically a computer 31, which contains a specific second version of the same database, for short called the master version. Below the computer 30 is for short called PC (Personal Computer) and the computer 31 is called mainframe. These terms are exemplary and they do not put limitations on the database version under consideration or on the types of computers or other means which can be used to apply the invention. The PC 31 contains an application section 32, a database 33, and a synchronisation section 37. The synchronisation section 34 of the PC comprises in addition to the actual synchronisation process controller also a DBMS (DataBase Management System) call interface 34a, an instruction interface 34b, and a message interface 34c. The corresponding interfaces are indicated in the mainframe synchronisation section 37 by the reference numerals 37a, 37b and 38c.

As a response to the instructions provided by the user of the PC 30 the application section 32 creates transactions, which comprise statements and which modify the contents of the database 33. When the PC application 32 creates a transaction and directs it towards the database 33, then the PC 30 saves both the modified data and the statements, which form the data modifying transactions. The statements are stored in the database 33 and in that connection also the parameters relating to these statements are saved. There can also be parameters which relate specifically to each transaction, and which can be permanent, in other words stored in the database together with a transaction. Also these transaction based parameters are stored in the database 33. The statements are typically written in the SQL language, or procedure calls defined in any other known database language, and different alternatives known per se are available for storing them.

In the PC the instruction interface 34b of the synchronisation section 34 is a plurality of procedures, with which the application section 32 can control the synchronisation procedure of the databases regarding the PC. One of the instruction interface procedures is the synchronisation initialisation instruction, with which the application section initiates the propagation of the transactions regarding the PC. The actual operating section is then the PC synchronisation process controller, which collects the transactions formed by the stored statements into messages to be transmitted to the mainframe. The invention does not actually limit the contents or the structure of these messages, as far as they can transmit to the mainframe those transactions, statements and parameters which are stored in the database 33. Depending on whether the data communication link between the PC and the mainframe is open or not, the synchronisation process controller transmits the ready messages via the message interface 34c to the mainframe, or stores them in a message store to wait for the transmission.

The mainframe receives the messages transmitted by the PC via the message interface 37c and stores them in its own message store (not particularly shown in the figure) to wait for the transactions to be directed to the master database. The last mentioned process can be automatic, for instance in a regularly repeated synchronisation run, or it can be made when the message store is filled, or it can be made as a response to a synchronisation instruction given by the mainframe operator. Each message is processed in the mainframe as a process comprising tasks (typically transactions and their statements and parameters), which are controlled by the synchronisation process controller in block 37. Within the process the process controller processes the transactions conveyed by the message. As the first step in the process it reserves a particular space in the computer memory for the transaction's bulletin board. An exemplary transaction parameter, which the process controller can write on the bulletin board, is a parameter (DatabaseType) indicating the type of the database, which at this stage can be given the value "Master". Via the bulletin board this parameter is transmitted to those transaction statements, whose function depends on whether the processed database is a copy or a master. The value "Master" indicating the database type means particularly that the application will not control the validity of the transactions, but the control must be based on the logical characteristics which the transaction contains according to the invention.

The process controller can directly process the statements in database language belonging to the transaction. If the statement is not in the SQL language or if it otherwise is not a statement supported by the database server or the synchronisation section, then it is interpreted as a remote procedure call and it is directed from the synchronisation section 37 to the application section 35, which processes the procedure representing the statement. This procedure again can modify the contents of the master database with its own database operations. These database operations are made as a part of the transaction being processed. When the whole transaction has been processed, its bulletin board is not needed anymore and the memory space reserved by the bulletin board can be cleared for other use.

An exemplary transaction 40 and its propagation in the arrangement according to the FIG. 3 is discussed in below. Assume that the user of the PC 30 with the aid of the application section 32 creates a transaction representing an order made by the customer, whereby the transaction comprises three statements. FIG. 4 shows schematically these statements and those database tables which are affected by them. The statements in the transaction are as follows:

41: InsertOrder(itemNumber, orderedAmount)—This statement adds a new row in the Order table 44, whereby the essential data in this row are the item number and the ordered amount of the product, which are supplied as input data to the statement. According to established practice in the industry the names of the input parameters given to the statements are shown in parenthesis after the statement's name. The rows in the Order table can of course also contain plenty of other data.

42: InsertBookkeepingEntry(accountNumber, amount)—This statement adds a row in the Bookkeeping entries table 45 which describes the order made by the customer.

43: UpdateAccountBalance(entryId)—As input data this statement is given an identification number, which identifies the row in the Bookkeeping entries table 45 created by the previous statement. It reads from the current row that account number which this Bookkeeping entry refers to, and also the numerical value of the entry, and then it updates the balance of said account in the Accounts table 46, so that the balance reflects the new situation.

The following business rules control the use of the statements in the database:

1) The status of the order can be marked as "Active" only if according to the stock bookkeeping there is sufficiently material in stock to satisfy the order. Otherwise the order status must be marked as "RequiresManualApproval".

2) The status of the bookkeeping entry can be marked as "Approved" only if the status of the corresponding order is "Active". Otherwise the status of the bookkeeping entry must be marked as "RequiresManualApproval".

3) The balance of the account can be updated only if the status of the corresponding bookkeeping entry is "Approved".

Let us assume that a transaction comprising the three above mentioned statements is successful in the copy database 33, whereby the status of the order generated by the statement 41 is "Active", the status of the bookkeeping entry generated by the statement 42 is "Approved", and the balance of the account has been updated according to the statement 43. The transaction causing these modifications is also saved in the copy database maintained by the PC. The next step is to synchronize the databases, so that the modifications represented by the transaction are transmitted to the master database 36.

The final validity of the transaction in the master database can not yet be confirmed using the above presented business rules in that stage when the modifications are made in the copy database, because either the copy database does not at all contain the stock bookkeeping, or in the best case the copy database bookkeeping information represents the stock situation only at that moment when the copy was made. Thus the transaction must operate differently, depending on whether it acts on the copy database or on the master database.

A transaction is transmitted to the mainframe in the same manner as that presented above with reference to FIG. 3. The synchronisation process controller 37 of the mainframe reserves a particular memory space as a transaction bulletin board 47 and processes the statements one at a time. The first statement 41 contains a logical act 48, which checks whether the stock bookkeeping contains so much merchandise that it is sufficient to cover the order, whereby the order size is indicated as the parameter "orderedAmount". If the check provides a negative result, then the order must get the status "RequiresManualApproval". Information about the modified status must be transmitted to the other statements 42 and 43, because their function depends on the order's status. Thus the parameter "Status" is added to the transaction's bulletin board, and it is given the value "RequiresManualApproval". When the next statement 42 is processed there is a check whether the bulletin board has a parameter "Status", and if so, what value it has. If the value "RequiresManualApproval" is found there, then the statement 42 generates a row in the master database Bookkeeping entries table, where the row has a bookkeeping status value "RequiresManualApproval" according to the business rule 2). The third statement 43 will not update the account balance, according to the business rule 3), because the information that the corresponding bookkeeping entry status is not "Approved" was relayed via the bulletin board.

According to the above presented exemplary embodiment the intelligent transaction according to the invention can contain in one or more statements (even in all statements) logical operations, which are used to identify the transaction's validity before the modifications represented by the statement are made in the database. The information generated by the logical operations are transmitted from one statement the another statement via the common bulletin board of the transaction, so that it is not necessary that the statements refer directly to each other, and it is even not necessary that the statements contain any information about which other statements are included in the transaction. With the aid of logical operations the transaction's statements can cause different modifications of the database, depending on whether the transaction acts on a copy database or on the master database.

Though we above discussed only the mutual synchronisation of two database versions, the invention can easily be generalised to all kinds of situations occurring during the life of a long transaction, where a previously generated transaction must be amended or it must be processed later than immediately at the time when it is generated.

To a person skilled in the art it is obvious that in order to have an illustrative description the above presented exemplary embodiments have a structure and a function which are relatively simple. By applying the model presented in this application it is possible to design different and very complicated transactions which utilise the inventive idea presented in this application.

What is claimed is:

1. A method for modifying data contained in a database;
   wherein such method comprises a plurality of steps intended to modify the data forms a transaction;
   wherein said transaction comprises statements that operate within the database, of which statements at least one statement is arranged to transmit information between that statement and another statement, and parameters both regarding the statements and regarding the transaction;
   wherein at least one statement of the transaction contains a logical operation in order to check the transaction's validity, whereby the information about the result of said logical operation after its performance is added to the common information exchange space of the transaction.

2. A method according to claim 1, wherein at least one statement of the transaction contains a logical operation in order to check the transaction's validity, whereby the information about the result of said logical operation after its performance is added to the common information exchange space of the transaction.

3. A method according to claim 1, wherein information indicating which database version the transaction concerns is written into the common information exchange space of the transaction when the transactions propagate between the database versions.

4. A method according to claim 3, wherein in order to propagate transactions between the database versions:
   the statements forming a transaction are saved in a first computer which generates and saves the transaction;
   the transaction is transmitted in a message to a second computer, which at a later time will process the previously generated transaction;
   the second computer interprets the message into one or more transactions comprising statements and parameters;
   the second computer reserves a specific space in the memory to act as a common information exchange space and writes there the information about towards which database version the transaction is directed;
   those statements included in the transaction, which are not immediately processable instructions in the database language, are routed via the section processing them; and
   the database version maintained by the second computer is processed in a manner dictated by the statements in the transaction.

5. A method according to claim 4, wherein those statements included in the transaction which are not immediately processable instructions in the database language are routed in the second computer as remote procedure calls through the corresponding application section.

6. A system for maintaining a first database version;
   wherein the system is arranged to store the modifications to be made in the database as transactions, whereby the transactions comprise statements that operate within such database, of which at least one statement is arranged to transmit data between that statement and another statement, and parameters both regarding the statements and regarding the transaction;
   wherein the system further comprises means to assemble the transactions to be transmitted to the second database version into messages and means to transmit the messages to the computer maintaining the second database version.

7. A system provided with a memory for maintaining a second database version, characterized in that it is arranged to generate a transaction from the message it receives, whereby the transaction comprises statements, and to reserve a data exchange space in the system memory in order to make the transaction parameters available to the statements belonging to that transaction, and in order to transmit data between the statements belonging to the transaction.

8. A system according to claim 7, further comprises an application section, characterized in that it is arranged to route those statements which are not immediately processable instructions in the database language as remote procedure calls through the application software section.

* * * * *